US007283880B2

(12) United States Patent
Dick

(10) Patent No.: US 7,283,880 B2
(45) Date of Patent: Oct. 16, 2007

(54) METHOD AND APPARATUS FOR ELAPSED PLAYBACK TIMEKEEPING OF VARIABLE BIT-RATE DIGITALLY ENCODED AUDIO DATA FILES

(75) Inventor: Robert James Dick, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 777 days.

(21) Appl. No.: 10/488,918

(22) PCT Filed: Jun. 28, 2002

(86) PCT No.: PCT/US02/20364

§ 371 (c)(1),
(2), (4) Date: Mar. 5, 2004

(87) PCT Pub. No.: WO03/023785

PCT Pub. Date: Mar. 20, 2003

(65) Prior Publication Data

US 2004/0249489 A1    Dec. 9, 2004

Related U.S. Application Data

(60) Provisional application No. 60/317,573, filed on Sep. 6, 2001.

(51) Int. Cl.
*G06F 17/00* (2006.01)
(52) U.S. Cl. .......................................... 700/94; 386/68
(58) Field of Classification Search .................. 700/94; 386/68, 69, 6, 7, 40
See application file for complete search history.

(56) References Cited

FOREIGN PATENT DOCUMENTS

| EP | 717411 | 6/1996 |
|---|---|---|
| EP | 786909 | 7/1997 |
| EP | 917143 | 5/1999 |
| EP | 1043725 | 10/2000 |
| EP | 1117258 | 7/2001 |
| WO | 01/13373 | 2/2001 |

OTHER PUBLICATIONS

I Huetter et al: "Entwicklung Eines DVD-Players: Probleme Und Loesungen" Fernseh Und Kinotechnik, vol. 53, No. 11, Nov. 1999, pp. 664-669.
"Treo 10 Review" HOTMP3GEAR.COM, Dec. 14, 2001, pp. 1-7.
Search report dated Apr. 16, 2003.

*Primary Examiner*—Sinh Tran
*Assistant Examiner*—Walter F Briney, III
(74) *Attorney, Agent, or Firm*—Joseph J. Laks; Robert D. Shedd; Paul P. Kiel

(57) ABSTRACT

The present invention involves a digital audio player and a method for processing encoded digital audio data, wherein the digital audio data is encoded using one of a plurality of encoding formats. The audio data player has a hard disk or other data storage medium for storing data files, a microcontroller, buffer memory for anti-skip protection, and an audio decoder. The encoded audio data files and associated decoder files are downloaded from a personal computer or similar device to the audio data player hard drive. The player provides a menu-driven user interface for selection, sorting, and playback of stored audio data files. During playback, elapsed playback time is computed and displayed. For variable bit-rate audio data files, the audio data player generates an elapsed playback timekeeping map concurrently with playback and fast forward scan of audio data files. Concurrently with playback, forward scan, and reverse scan of the audio data file, the audio data player determines the compression ratio for each data portion traversed, and calculates a playback time for each data portion traversed.

8 Claims, 9 Drawing Sheets

METHOD AND APPARATUS FOR ELAPSED PLAYBACK TIMEKEEPING OF VARIABLE BIT-RATE DIGITALLY ENCODED AUDIO DATA FILES

This application claims the benefit, under 35 U.S.C. § 365 of International Application PCT/US02/20364, filed Jun. 28, 2002, which was published in accordance with PCT Article 21(2) on Mar. 20, 2003 in English and which claims the benefit of U.S. patent application No. 60/317,573, filed Sep. 6, 2001.

BACKGROUND OF THE INVENTION

The present invention relates to an apparatus and a method for processing digitally encoded audio data and features of related music management software.

The use of portable audio data players capable of playing digitally encoded audio data has become commonplace. In particular, relatively small handheld devices that can process digitally encoded audio data stored on solid state memory devices have become popular. Additionally, as demand has increased for higher data storage capacity in portable audio data players, another generation of players has been developed and is gaining popularity. These portable audio data players include miniaturized high capacity hard drives that are not as susceptible to skips and other similar problems as are typical hard drives used in personal computers ("PC") and other applications.

In an audio data player, the digital audio data is loaded into a data storage device by first downloading the data to a PC from an audio CD, the Internet, or another digital audio device. The data is then usually compressed according to a selected encoding format and loaded into the data storage device associated with the audio data player.

The audio data is decompressed/decoded by the audio data player during playback according to the selected encoding format. A variety of encoding formats for compressing and decompressing audio data is available. As used hereinafter, the term encoding format refers to any encoding/decoding scheme that specifies the syntax and semantics of a compressed bitstream and how the bitstream must be decompressed for reproduction. Such encoding formats include, but are not limited to, MP3 and MP3 Pro.

The data structure used for MP3 files include a sequence of interleaved header frames and data frames. Each header frame includes various fields of information that pertain to the data frame that follows, for example, the bit rate used for compressing the data frame that follows. While the compression ratio used for encoding the audio data file may be fixed (constant bit rate or "CBR") or may vary frame to frame depending upon the complexity of the audio (variable bit rate or "VBR"), the amount of playback time represented by each frame remains the same for MP3 formatted files. Therefore, in a VBR file, the amount of data contained within each data frame will vary, thus presenting difficulties in displaying elapsed play time during playback, especially when forward or backward skipping during the playback of an audio data file. To solve this problem, audio data players generally develop a timekeeping map that must be precompiled prior to playback by reading all of the header frames of an audio data file. Unfortunately, the precompiling of a timekeeping map delays the commencement of playback once an audio data file is selected.

For MP3 encoded audio data files, the data file is prepended or appended with a special set of frames called an ID3 tag. The ID3 tag contains descriptive text and other data relevant to the audio data file. For example, the tag may include title, artist, album, year, comments, and genre. ID3 tag information is useful for searching, sorting, and selecting specific audio data files based on the information contained in the ID3 tag. Because ID3 tag information is often stored as textual characters, the information can be displayed on the display screen of an audio data player. Although such a user interface is useful for finding, selecting, and playing an individual audio data file, having to read the display can be distracting to a person using an audio data player while involved in an activity such as jogging or driving.

Most audio data players utilize a digital signal processor ("DSP") for performing audio decoding, decompression, and other transformations of the audio data file. For example, the DSP can provide various preset equalization modes or other audio enhancing settings that are useful for quickly selecting a specific playback preference. For example, a preset DSP mode may be specified for specific audio genres such as rock, jazz, and pop. Selection of such preset DSP modes generally requires the user to change the DSP mode during playback by pressing a designated button or selecting the DSP mode from a display menu.

Most PC-based audio data file management programs allow the user to create and edit playlists that can then be downloaded to a portable audio data player and used for playing a select sequence of audio data files. One such form of playlist typically associated with MP3 audio data files is known as an M3U list. An M3U playlist consists simply of a text file containing a numbered sequential list of paths or locations of data audio files included in the playlist. Thus, a playlist created on a PC and downloaded to an audio data player may be used to selectively play a sequence of audio data files that are contained in the data storage of the audio data player. However, audio data players generally do not allow a playlist to be created or edited on the audio player itself. Additionally, the M3U file format includes only the file location or path information and a comment field. Thus, the M3U file format does not contain other audio data file information such as the information contained in an ID3 tag of an MP3 audio data file.

BRIEF SUMMARY OF THE INVENTION

The present invention addresses some of the above-noted limitations of audio data players, particularly handheld audio players, by providing an audio data player having a microcontroller coupled with data storage and an audio decoder for processing encoded audio data files and displaying the elapsed time without pre-processing of the audio data. In particular, the present invention provides a method for calculating and displaying elapsed playback time of a variable bit-rate audio data file. The present invention also provides a method for generating an elapsed playback timekeeping map during playback and fast forward scans modes of audio data files. Alternatively, the elapsed playback may be determined by calculating the average forward bit-rate in combination with the amount of bits processed during the playback operation.

The audio data player generally includes a microcontroller coupled with a user interface, data storage, buffer memory, and an audio decoder. The user interface includes an LCD and a keyboard having various multi-way and multi-function switches. The audio data player also provides a universal serial bus ("USB") port for connection to a PC or other USB-equipped device. By connecting the audio data player to a PC via the USB port, audio data files and audio playlists can be downloaded to the audio data player and stored into data storage. In one embodiment, the data storage comprises a 10 GB hard drive; however, other moving data storage media or solid state memory devices, such as flash memory cards, may also be used. In this embodiment, the user interface provides menu driven selection, sorting, and playback of audio data files. Additionally, during playback of an audio data file, the LCD displays ID3 tag information such as title, artist, album, and genre. The LCD screen may also display other information such as elapsed playback time, volume level, and preset DSP mode.

The disclosed embodiment of the audio data player is a portable handheld unit having a rechargeable battery, 5 volt DC input, headphones output port, and line out port. Therefore, the audio data player can be used for portable applications using headphones, or for fixed applications using AC power and headphones or another audio device.

In one form thereof, a method is disclosed for monitoring in an audio data player the elapsed playback time for an audio data file having data portions capable of having different compression ratios, characterized by, concurrently with playback, forward scan, and reverse scan of the audio data file, determining the compression ratio for each data portion traversed, and calculating a playback time for each data portion traversed.

In another form thereof, in an audio data player comprising a microcontroller coupled with data storage and an audio decoder, a method is disclosed for displaying the elapsed playback time of an audio data file, characterized by generating a timekeeping map concurrently with playback and forward scan of the audio data file, and calculating and displaying an elapsed playback time concurrently with playback, forward scan, and backward scan.

In yet another form thereof, an audio data player comprising a microcontroller coupled with data storage and an audio decoder is disclosed, characterized by the data storage storing audio data files, a circular buffer coupled to the data storage and buffering streaming of audio data, a timekeeper calculating an elapsed playback time for each portion of audio data exiting the circular buffer (T1), a linear buffer receiving data from the circular buffer, the linear buffer containing a time-length of audio data ($\Delta T$), the audio decoder receiving data from the linear buffer, and the timekeeper calculating an elapsed playback time (T2) comprising the elapsed playback time for audio data exiting the circular buffer (T1) minus the time-length of audio data contained in the linear buffer ($\Delta T$).

Advantageously, the disclosed audio data player does not require that the entire audio data file be scanned for generating a timekeeping map before beginning playback of the audio data file. Thus, the disclosed audio data player does not have the delay after selecting an audio data file for playback that is associated with precompiling a timekeeping map. Additionally, generation of the timekeeping map does not require that the actual audio data be processed.

BRIEF DESCRIPTION OF THE DRAWINGS

The above mentioned and other features and objects of this invention, and the manner of attaining them, will become more apparent and the invention itself will be better understood by reference to the following description of one embodiment of the invention taken in conjunction with the accompanying drawings, wherein.

Figure 1:
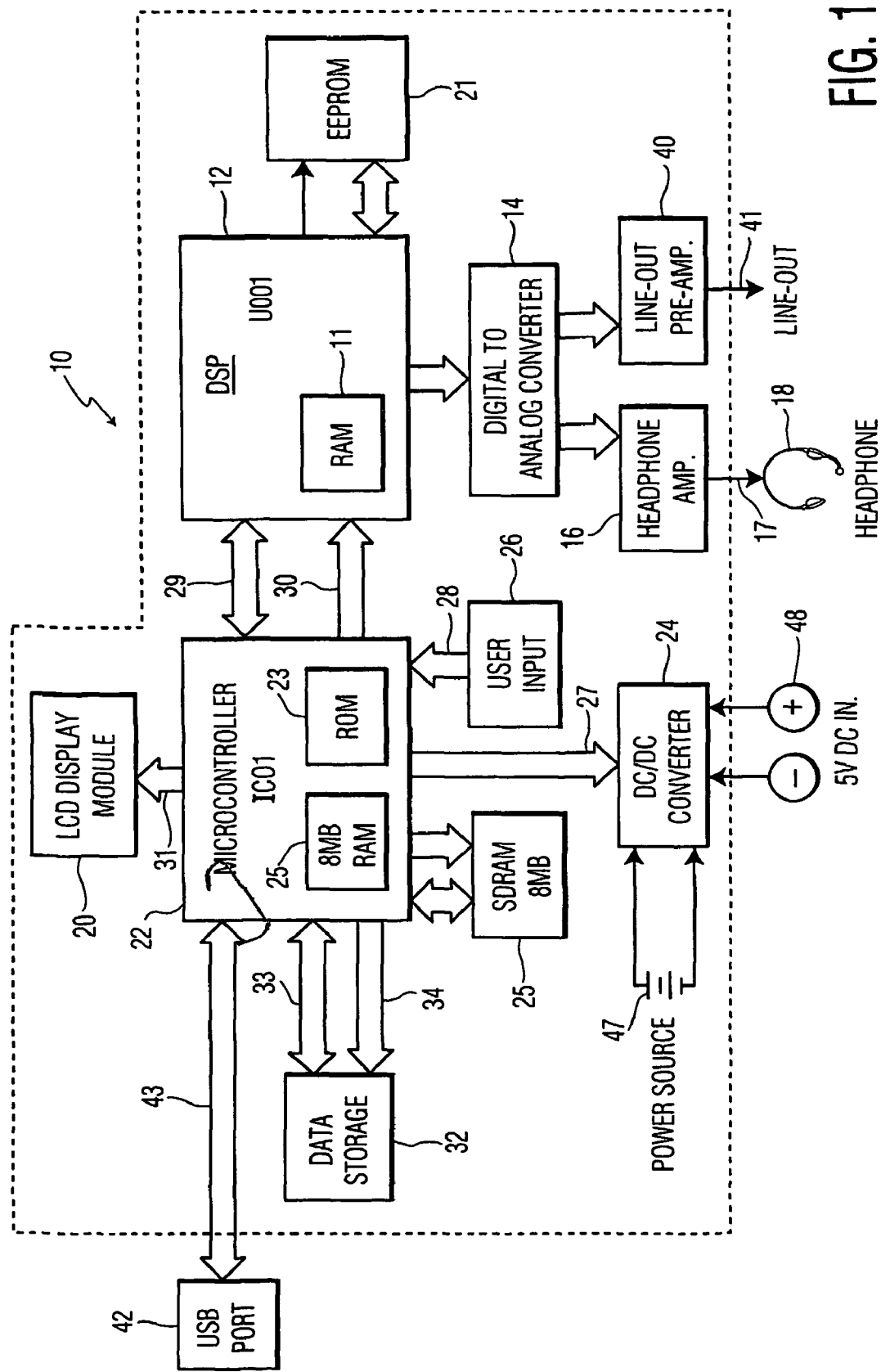
FIG. 1 is a block schematic diagram of a portable audio data player according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates one embodiment of the invention, in one form, and such exemplifications are not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

FIG. 1 shows a block diagram of portable audio data player 10 according to the present invention. The general arrangement and operation of the various elements are described hereinbelow. However, the details of the various elements of audio data player 10 are well known to those skilled in the art and will not be discussed here. Audio data player 10 comprises microcontroller 22 that controls the various elements and the overall operation of audio data player 10, including transferring data from data storage 32, through buffer memory 25, and to audio decoder DSP 12. Microcontroller 22 includes a suitable amount of memory 23, for storing various instruction sets and programs for controlling the operation of audio data player 10.

DSP 12 may be programmed to perform a variety of signal processing functions during playback of a selected audio data file. In this case, the functions that DSP 12 performs during playback include, but are not limited to, decoding audio data files, volume control, digital sound equalization, and sample conversion. In that regard, DSP 12 includes onboard memory 1, wherein the decoder files, audio data files, equalizer mode selection, and various other required data are loaded during playback.

The decoder files comprise programs that control the decoding operations of DSP 12 and the audio data files include data associated with the audio content. Both the audio data files and the decoder files may be stored in data storage 32. The decoder file including the programs are transferred to DSP memory 11 from data storage 32. Alternatively, the decoder files may be stored in ROM 23, RAM 11 or other suitable storage device of player 10. Further, the decoder files and other system files and programs may also be stored in SDRAM 25, EEPROM 21 or other suitable storage devices coupled to DSP12.

Audio data and decoder programs stored in data storage 32 may be encrypted, requiring that decoding program files and audio data files be decrypted by DSP 12 using one or more decryption keys. The decryption keys may also be stored in data storage 32 and may be security linked to the particular storage device or some other coded component of audio data player 10 so that audio data files encrypted for use on a particular audio data player may only be decrypted and played by that particular audio data player.

As a selected audio data file is decoded, DSP 12 provides the decoded data stream to digital to analog converter 14. D/A converter 14 converts the digital output of DSP 12 into an analog signal and provides the analog signal to headphones amplifier 16 and lineout pre-amp 40. The analog signals are amplified and provided to lineout jack 41 and headphones jack 17, both disposed on housing 13 of audio player 10.

DSP 12 may include a plurality of selectable preset equalization modes, for example, bass, jazz, pop, rock, and flat. Each of these selectable equalization modes is specifically configured to enhance the audio reproduction of the type of audio information, such as the genre of music or type of speaking that is encoded in the audio data. Additionally, the exemplary embodiment includes automatic selection of the DSP equalization mode and further allows the user to manually set the sound equalization via a graphic equalizer user interface displayed on display 21 by LCD display module 20. Alternatively, player 10 may advantageously include a single IC that incorporates the functions of microcontroller 22 and DSP 12 into one unit. An IC suitable for such purpose includes, but is not limited to, TMS320DA250 manufactured by Texas Instruments, Inc. Such an IC can be configured to decode and processes the MP3 files in the known manner, and also programmed to provide the automatic DSP selection feature described below.

Audio player 10 is adapted to operate with data storage 32. In this embodiment, data storage 32 is a moving data storage device, specifically a hard drive, that can be used to store various data files, including encoded audio data files, decoder files for controlling the decoding operation of DSP 12, playlist files, and computer data files, such as, for example, word processing files, presentations, and spreadsheets. A large amount of data can be readily transferred between data storage 32 and microcontroller 22 through data bus 33. Buffer memory 25 operates as a circular data buffer to prevent interruption of audio playback caused by a skip or other similar moving data storage device data transfer delays. Using the present invention, decoder files, playlists, and relatively large amounts of audio data can be stored on data storage 32.

In accordance with the present invention, audio data files are loaded into data storage 32 via USB port 42 from a PC, or other similar device, using music management software that encodes the audio data files in accordance with a selected encoding format, such as MP3, or MP3 Pro, and then stores the encoded data files. Such music management software is implemented using programming methods known in the art. The music management software transmits the audio data files and appropriate decoder files to audio data player 10 across data buses 43 and 33 and into data storage 32. The music management software also generates, and modifies as necessary, a system configuration file and a file attribute table to provide information regarding the various data files and decoder files stored in data storage 32. Using the configuration file and the file attributes table, audio data player 10 is able to display audio data files sorted by various groupings on display 21, determine the correct encoding format for each audio data file, and download the appropriate decoder file for each content file in response to a user selection.

Figure 2:
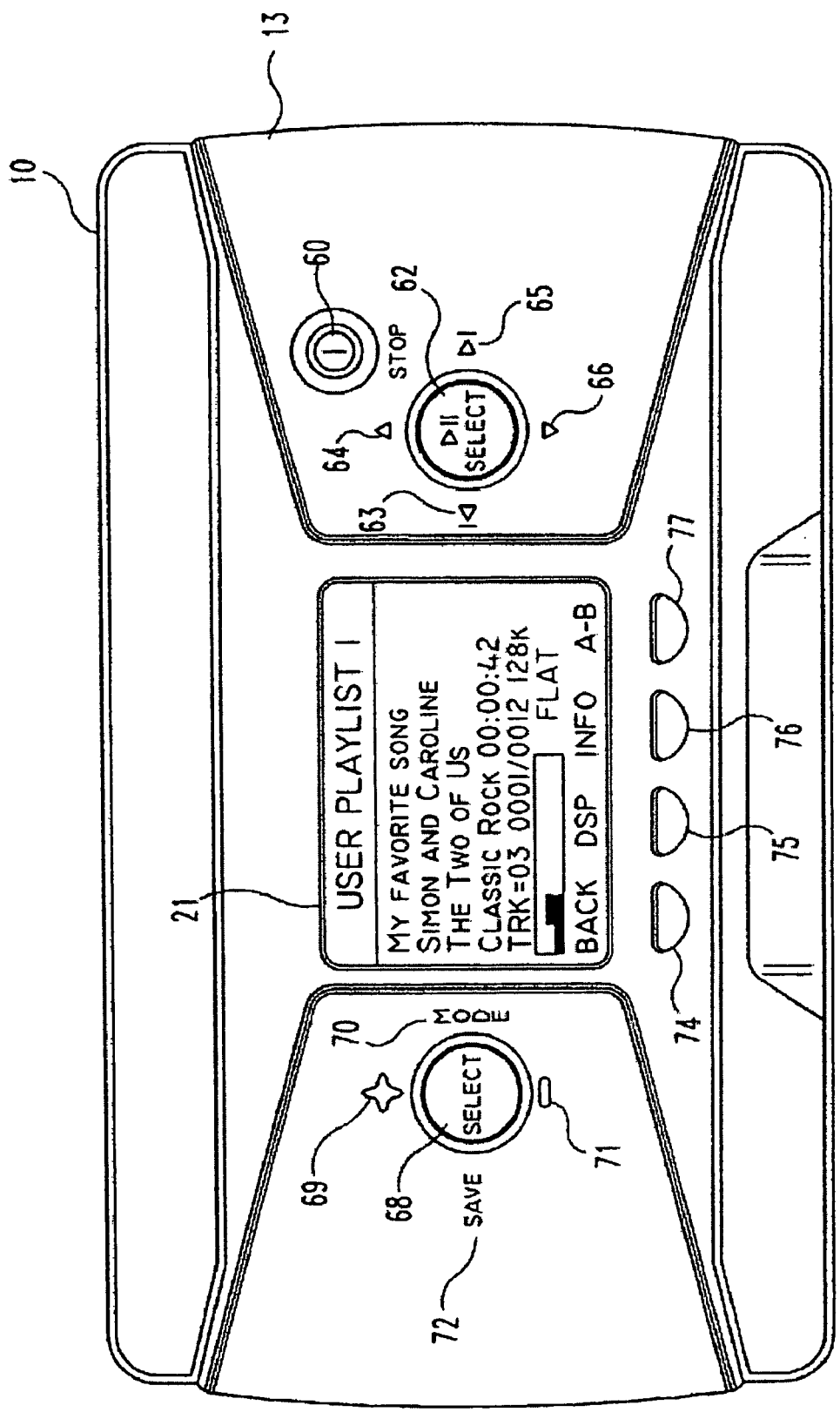
FIG. 2 is a top view of a portable audio data player according to the present invention.
Figure 3:
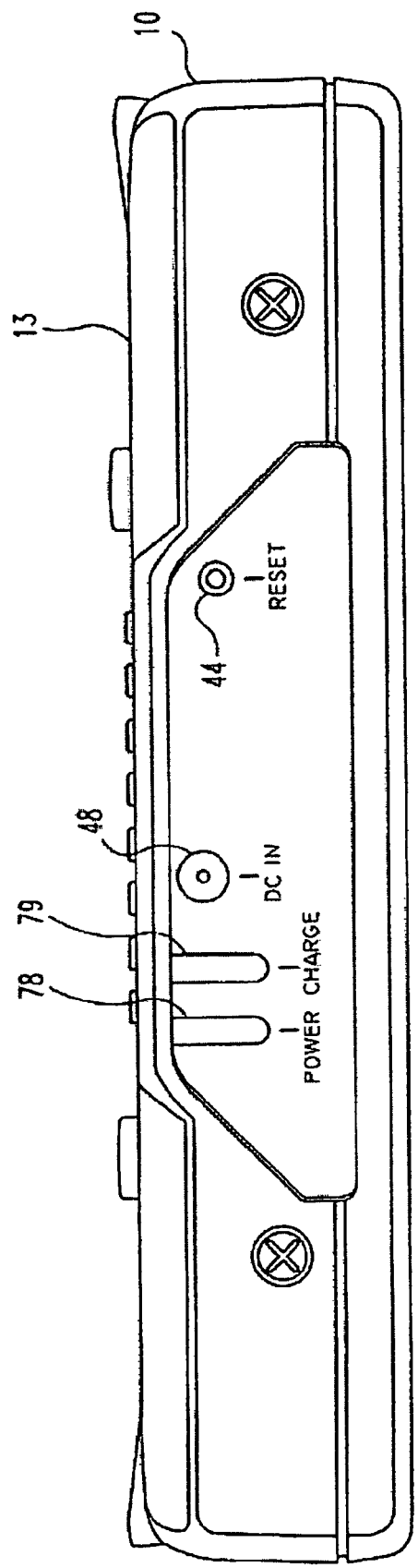
FIG. 3 is a back view of the portable audio data player of FIG. 2.
Figure 4:
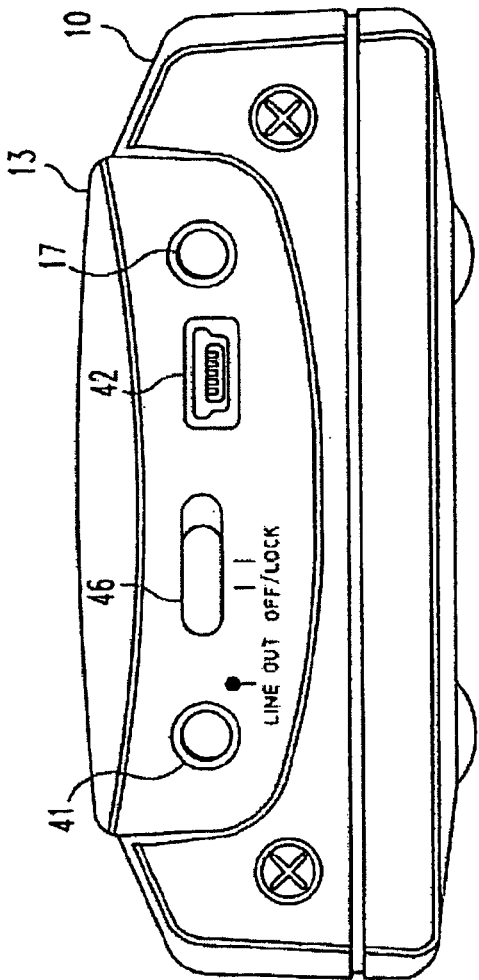
FIG. 4 is the right side view of the portable audio data player of FIG. 2.

FIGS. 2-4 illustrate an exemplary embodiment of the displays, buttons, switches, indicators, and ports which may be disposed on housing 13 of audio data player 10. Referring to FIG. 2, user input 26 comprises a plurality of buttons 44 (FIG. 3), 46 (FIG. 4), and 60-77 disposed on housing 13 of audio data player 10 for allowing a user to sort and select particular audio data files for playback, and to control playback settings. User input 26 may also comprise other input devices known in the art, for example, keyboard, voice activated touch pad, and touch screen input devices. Two multi-way switches comprise buttons 62-66 and 68-72. Soft keys 74-77 are multi-function buttons whose function change for various user interface menu displays. Audio data player 10 also includes display 21 disposed on housing 13. Display 21 displays the audio data files and playlists stored in data storage 32, the function of soft keys 74-77, and various status information associated with audio data player 10, such as the playback status shown in FIG. 2 and the top-level menu shown in FIG. 5.

Referring again to FIG. 2, STOP/POWER button 60 allows the user to stop playback and to turn audio data player 10 on and off. PLAY/PAUSE button 62 allows the user to start playback and to pause playback. Left arrow button 63 allows a user to move a highlight left when using the menu, and to skip back to the previous audio data file or scan backward in the present audio data file when playing music. The right arrow button 65 allows the user to move a highlight right when using the menu, skip forward to the next audio data file, and scan forward in the current audio data file when playing music. Up arrow button 64 allows the user to move the highlight up when using the menu. Down arrow button 66 allows the user to move the highlight down when using the menu.

Referring still to FIG. 2, SELECT button 68 allows the user to select a highlighted item. Volume up button 69 increases the playback volume level for headphones 18 and volume down button 71 decreases the volume level. MODE button 70 allows the user to select a particular playback mode, including NORMAL, REPEAT, REPEAT ONE, REPEAT ALL, SHUFFLE, and REPEAT ALL SHUFFLE. SAVE button 72 allows a user to create a new playlist or add audio data files to an existing playlist. Soft keys 74-77 select the menu item that appears just above each button at the bottom of display 21.

Referring to FIG. 3, POWER indicator 78 lights when audio data player 10 is on. CHARGE indicator 79 lights when the power source 47 is charging. In the exemplary embodiment, power source 47 is a rechargeable battery pack. DC IN jack 48 provides 5 volt DC from an AC adapter to power audio data player 10 and recharge power source 47. RESET button 44 allows the user to reset all of the audio data player settings to the factory defaults.

Referring now to FIG. 4, OFF/LOCK switch 46 allows the user to make buttons 60-77 inactive when switch 46 is slid to the locked position. LINE OUT jack 41 allows a user to connect the audio data player to a separate audio system. Headphones jack 17 allows the user to play the decoded audio on headphones 18. USB port 42 provides connection of audio data player 10 to a PC or other similar device using a USB cable.

When the user selects a particular audio data file for playback via user input, microcontroller 22 loads the appropriate decoder file associated with the selected audio data file from data storage 32 into DSP memory 1. Referring again to FIG. 1, microcontroller 22 then streams the selected audio data file along buses 33 and 29 into DSP 12, using buffer memory 25 as a skip-protection buffer.

After streaming of the selected audio data file begins, DSP 12 decodes the audio data file using the associated decoder file. The decoder files stored in data storage 32 allow audio player 10 to be adapted to process the various encoding formats associated with the audio data files stored in data storage 32. In effect, portable audio player 10 is software upgraded, as necessary, by the decoder files stored in data storage 32 when the user selects a particular audio data file stored in data storage 32. The steps associated with processing a selected audio data file from data storage 32 using audio data player 10 is shown in the flowchart of FIG. 6, and described below.

Figure 6:
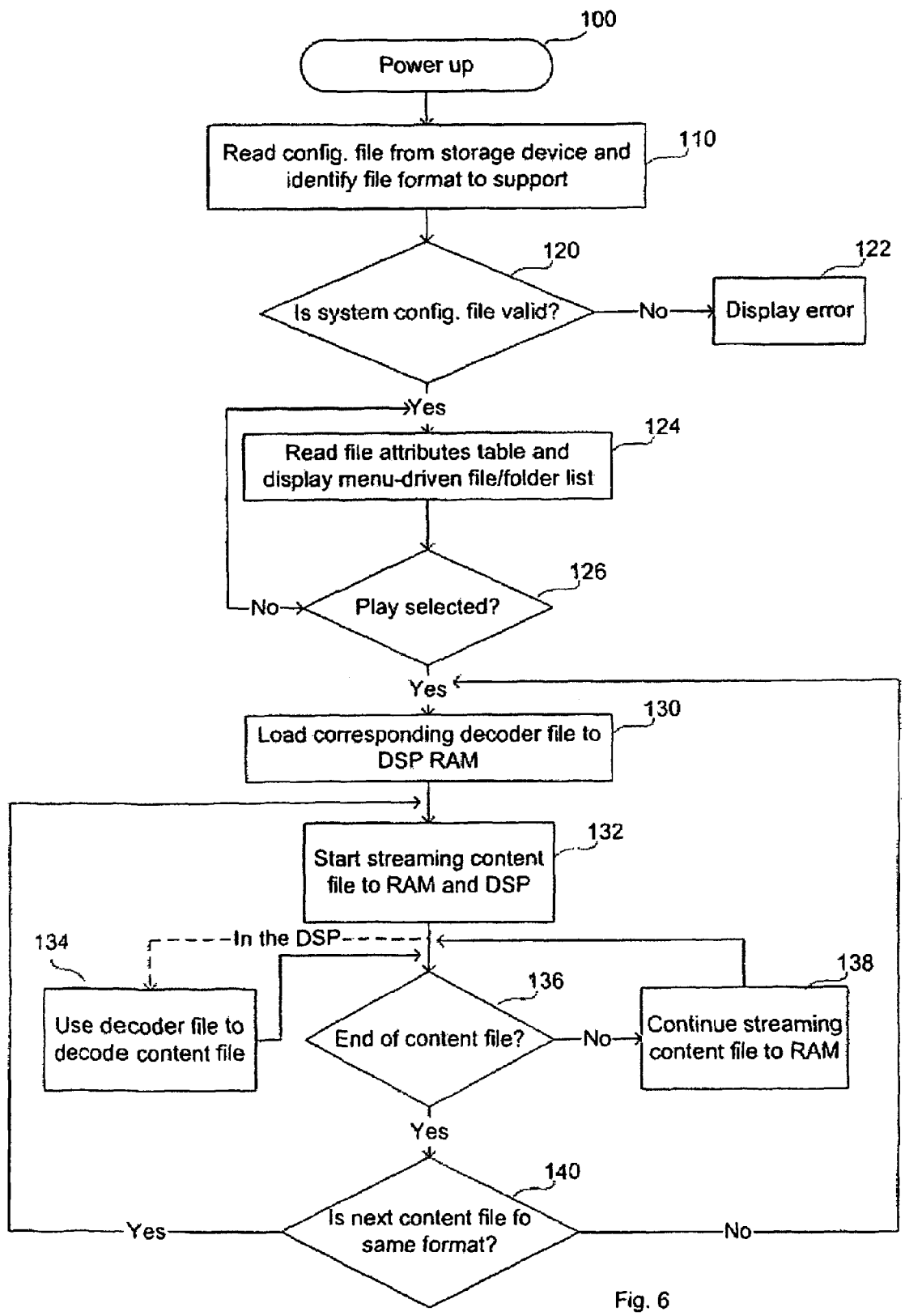
FIG. 6 is a flowchart diagram illustrating the steps for playing back an audio track using a portable audio data player according to the present invention.

FIG. 6 shows a flowchart illustrating the steps for processing a selected audio data file in accordance with the present invention. After powering up in step 100, microcontroller 22 of audio data player 10 loads the system configuration file from data storage 32, in step 110. Also in step 110, microcontroller 22 identifies the various file formats that need to be supported for the data files stored in data storage 32. The configuration file also includes information that equates the file extension of the audio data files with particular decoder files stored in data storage 32. In step 120, if a configuration file is not valid, microcontroller 22 causes an error indication to be displayed, step 122, on display 21. In step 124, if the configuration file is valid, microcontroller 22 reads the file attribute table stored in data storage 32 and causes display 21 to display a menu-driven listing of the file/folders stored in data storage 32.

Figure 5:
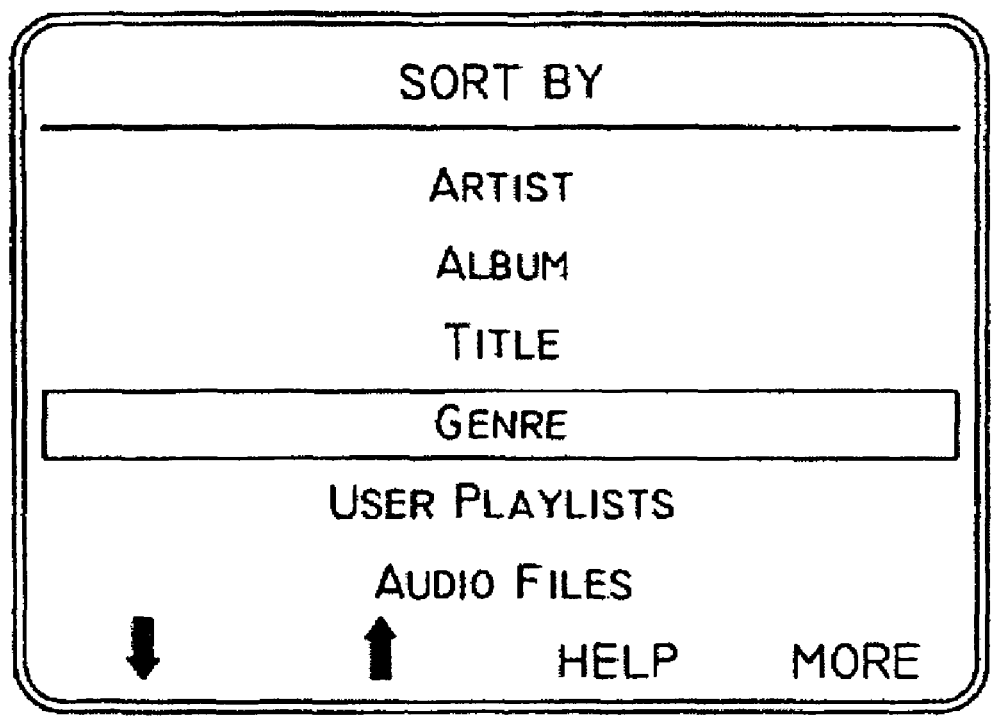
FIG. 5 is a plan view of the main menu displayed on the audio data player of FIG. 2.

Referring to FIG. 5, the main menu displayed on display 21 allows the user to navigate and display audio data files according to groupings or identifying characteristics, such as, for example, artist, album, title, genre, playlist, and all audio data files. From the main menu, the user may operate user input 26, as described above, to navigate sorted lists and select a desired one of the displayed audio data files or playlists for playback.

When an audio data file or playlist is selected for playback in step 126, microcontroller 22 and DSP 12 perform a number of steps, including several concurrent steps, to provide audio playback. First, microcontroller 22 identifies and transfers the corresponding decoder file from data storage 32 to DSP memory 11 in step 130. For example, if the user selects an MP3 file, microcontroller 22 transfers the MP3 decoder file from data storage 32 to DSP memory 11. The MP3 decoder file is used to control the decoding operation of DSP 12.

In step 132, microcontroller 22 begins streaming the selected audio data file from data storage 32 through buffer memory 25 to DSP 12. In step 134, DSP 12 uses the decoder file to decode and decrypt, if applicable, the audio data file in accordance with the appropriate encoding format. The decoded audio data is provided to D/A converter 14 and headphone amp 16 and line out pre amp 40 for reproduction.

In step 136, it is determined whether all of the data in the selected audio data file has been transferred to buffer memory 25. If not, in step 138, microcontroller 22 continues to stream data from data storage 32 to buffer memory 25. If the transfer of data is complete as determined in step 136, microcontroller 22 determines in step 140 whether the next audio data file is encoded using the same format as the previous audio data file. If the encoding format of the next audio data file is the same as the previous encoding format, microcontroller 22 returns to step 132 and starts streaming the data from the next audio data file, which data is subsequently decoded in step 134 as before.

If the encoding format of the next audio data file differs from the encoding format of the previous audio data file, microcontroller 22 returns to step 130. In this case, a new decoder file associated with the next audio data file is transferred to DSP memory 11, and the steps of streaming the audio data file and decoding the data file using the newly loaded decoder file is repeated. In this manner, audio data player 10 is able to playback audio data files encoded using any one of a plurality of encoding formats, as long as the decoder file associated with the selected encoding format is available and can be downloaded onto DSP memory 11. In the present embodiment, the necessary decoder files are stored in data storage 32 along with the audio data files. As such, audio player 10 can be updated to play different encoding formats by software updating of the DSP via decoder files stored along with the audio data files in data storage 32. Thus, audio data player 10 is capable of playing back data files encoded using a variety of encoding formats, including encoding formats that become available in the future.

During playback display, shown in FIG. 2, displays various information about the audio data file and the audio data player settings. For example, display 21 in FIG. 2 shows the file name, artist name, album title, genre, current track being played out of total files being played, volume level indication, elapsed play time of audio data file, playback mode indication, bit rate, and selected DSP mode selection.

Figure 7:
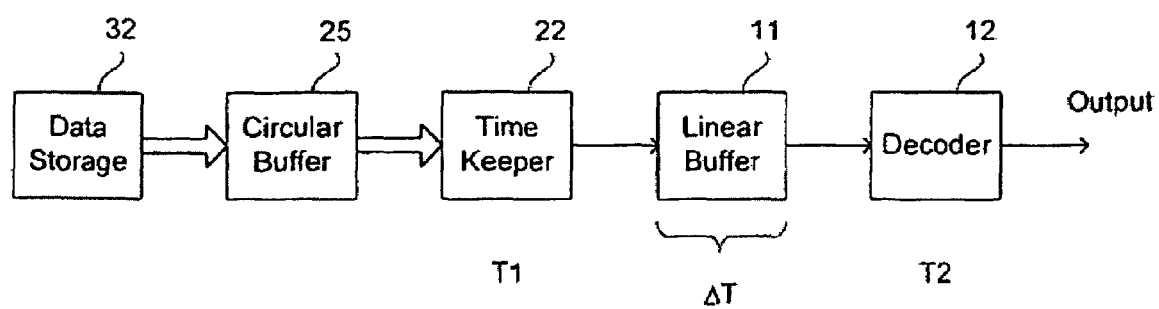
FIG. 7 is a block diagram of data flow through a portion of the audio data player of FIG. 2.

Referring to FIG. 7, the exemplary embodiment of audio data player 10 generates a playback timekeeping map concurrently with playback and fast forward scan of an audio data file. Additionally, audio data player 10 calculates and displays an elapsed playback time concurrently with playback, forward scan, and backward scan of an audio data file. As an audio data file is streamed from data storage 32 through buffer memory or circular buffer 25, microcontroller or timekeeper 22 calculates an elapsed playback time, T1, for each segment of audio data. As DSP memory or linear buffer 11 receives the audio data stream from circular buffer 25, linear buffer 11 contains a time length, $\Delta T$, of audio data. In order to calculate and display the elapsed playback time, T2, for the data leaving linear buffer 11 and entering DSP decoder 12 for decoding, timekeeper 11 subtracts the time length $\Delta T$ of audio data contained in linear buffer 11 from the elapsed playback time of audio data exiting circular buffer 25, T1. Thus, T2 represents the elapsed playback time of the audio data file for the audio data currently being decoded by DSP 12.

In the exemplary embodiment, although audio data is stored in data frames that vary in length depending on the compression ratio, timekeeping is performed for each data segment, specifically, for each 512 byte sector. Therefore, playback time for each sector or segment of data is calculated. If a sector boundary falls within a data frame, the times at the ends of the frame may be interpolated as desired.

The timekeeping map or data structure in the exemplary embodiment stores the playback time in milliseconds for each 64 sector block of data rather than for each sector of data. Therefore, an estimate of the playback time of a whole block is calculated and stored as each data sector is processed. Thus, the timekeeping map includes a playback time reference for every sector that has been processed, even if the entire block has not been processed. Advantageously, the timekeeping map can be generated without processing the actual audio data. Additionally, the block times may be stored in a 4,096 word (16 bits per word) circular buffer that represents about an hour of typical MP3 file playback time.

In the processes according to the present invention, the compression ratio or bit-rate for the data frame following the header frame is first read. Because timekeeping is performed in units of sectors in the exemplary embodiment, playback time is calculated per sector, $T_S$. A single MP3 data frame may be smaller or larger than one 512 byte sector, thus interpolation is completed as desired to calculate the playtime per sector, $T_S$. Additionally, because playback times are stored in the timekeeper map by data blocks of 64 sectors each, the present invention calculates the playback time per block, $T_B$. The playback time $T_B$ is calculated for the current block for each data sector processed, so that a playback time is available for each sector as it is processed rather than after each block is completed. Playback time $T_B$ for the current block is stored in the timekeeper map in circular buffer 25. The process is then repeated for the next data segment.

For each data sector traversed forwards or backwards, the process calculates and displays the elapsed playback time of the audio data file. Specifically, the present invention retrieves the playback time $T_B$ for the data block, which contains the current data sector. The elapsed playback time T1 is incrementally added to or subtracted from for the playback time of the current data sector being traversed. Thus, the playback time for the current data block is multiplied by the number of blocks, which is ¹⁄₆₄, because in the exemplary embodiment there are 64 sectors per block. The sector playback time is then added to the elapsed playback time T1 for playback or forward scan mode, or subtracted from T1 for backward scan mode (T2=T1±$T_B$*(# of blocks)). The playback time T1 is adjusted for the time length of the data residing in linear buffer 11, ΔT, which is equal to the size of linear buffer 11 in blocks multiplied by $T_B$(T2=T1−ΔT; ΔT=size of linear buffer in blocks *$T_B$). Thus, T2 represents the elapsed playback time of the audio data currently being transited and present at DSP 12. Elapsed playback time T2 is then displayed on a display device of audio data player 10.

In the exemplary embodiment of audio data player 10, small chunks of forward play alternate with large chunks of backward skipping during backward scan mode. Thus, during both the traversing of data during forward play and backward skips, audio data player 10 adds and subtracts the estimates of playback time being traversed in accordance with the flowcharts shown in FIGS. 8 and 9. Additionally, the present timekeeping method may also be used with a repeat A/B feature. As playback of an audio data file proceeds, the user can select a point A, where a repeat-interval will begin, and a point B, where the repeat-interval will end. When the user selects point A, the audio data file position in sectors is stored and the estimated elapsed playback time in milliseconds is stored. Whenever playback of the audio data file skips from point B back to point A, the elapsed playback time is reset to the stored value and playback proceeds forward from point A, timekeeping in accordance with the manner described below.

Figure 8:
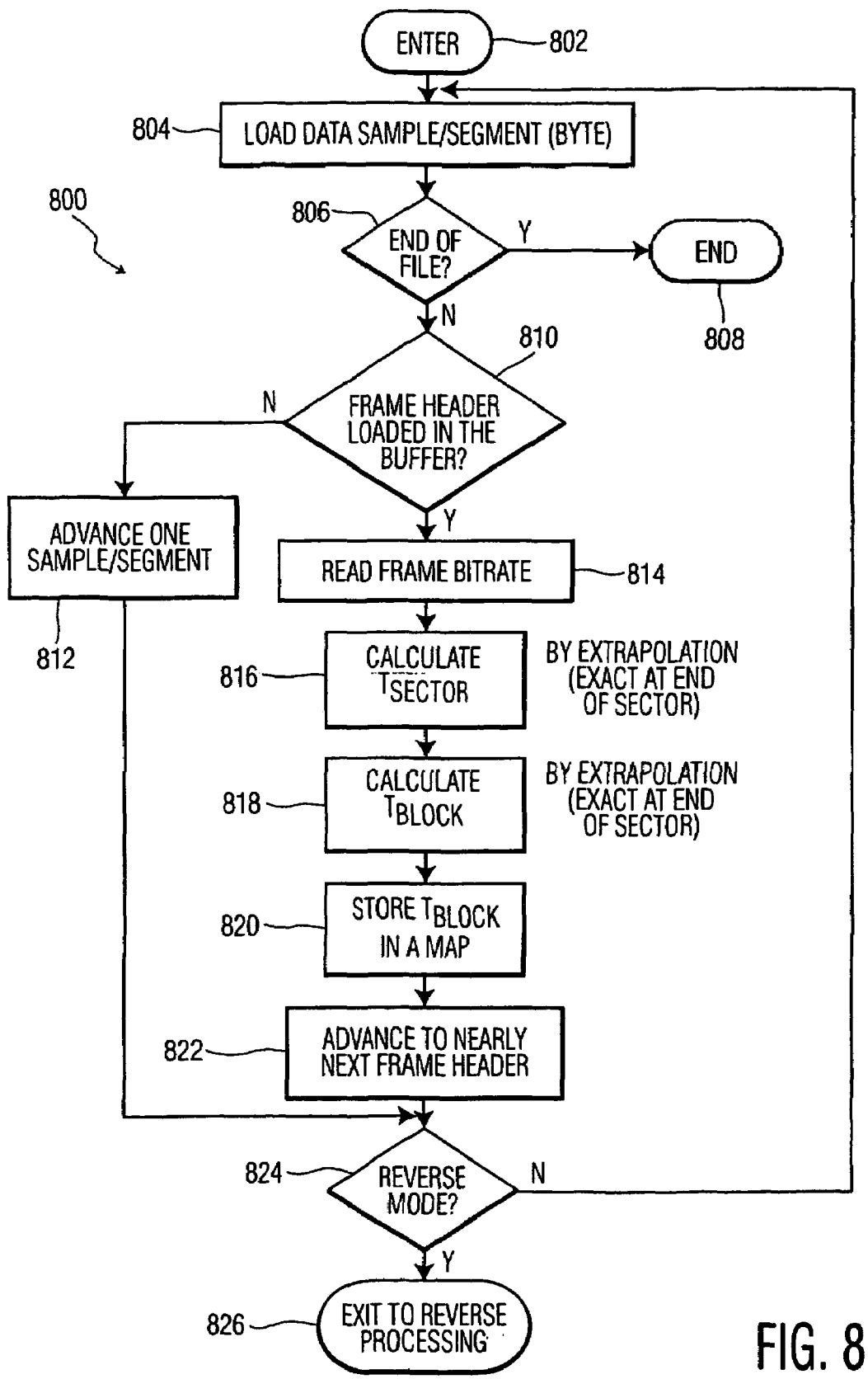
FIG. 8 is a flowchart diagram illustrating the steps for generating a timekeeping map and calculating and displaying an elapsed playback time in the forward modes.

The processes according to the present invention are now described more specifically below. Referring to FIG. 8, a flowchart of the process for generating a timekeeping map concurrently with playback and forward scan modes is shown. In step 804, a next sample/segment of the data, in this case one byte of data, is loaded into a buffer. In step 806 it is determined whether an end of the data file has been reached by loading the byte of data into the buffer. If so, the process ends at step 808. Otherwise, the process determines whether a frame header has been loaded into the buffer by the most recent loading of the data segment in step 810. It is determined whether a frame has been loaded by comparing the bit sequence with that associated with the frame header. If the buffer does not have a frame header, the process continues to step 812 to advance by one data sample/segment and then to step 824 to determine whether there has been any change in the operating mode, for example, by changing to a reverse mode. If a reverse mode has been selected, the process enters into a procedure for determining the elapsed time in the reverse mode as shown in FIG. 9.

If a frame header has been loaded into the buffer as determined in step 810, the 816 and calculates the time elapsed for each block of data in step 818. Recall that the time process reads the frame bitrate in step 814, calculates the time elapsed for each sector in step elapsed per frame is a constant for a given file. Therefore, the time for a sector may be taken to be the number of frame headers in the sector multiplied by the constant time per frame. As the process traverses the sectors in a given block, the process keeps a running count of the time so far in the block, and the number of sectors so far in the block. Then to estimate the block time, the process multiplies the sum of frame times by 64, and divides by the number of sectors so far in the block. Note that for the final sector of the block, this estimate of block time is exact, and this is the final estimate entered in the map. In step 820, the process generates a timekeeping map from the calculated values and stores the data. In step 822, the system advances a predetermined amount of data to a point that is nearly the next frame header start. Each frame size is known from parameters given in its header. It is advantageous to advance to nearly the next header to avoid potential false header codes in the data, and the to save computing time in verifying the header codes where the likelihood of the presence of a header code is very low.

Again, in step 824, the step determines whether the operating mode has been changed from the forward operating mode. If so, the process goes to step 826 and executes the steps for determining and displaying the elapsed time according to FIG. 9. If the operating mode has not been changed, the system proceeds to the beginning of the process to step 804 to repeat the above-described steps. Another aid to avoiding false header codes can be to generate a confidence measure indicative of the confidence that a series of true headers has been acquired. When the confidence measure is quite low, the process may be configured to replace step 822 with the step of advancing only one segment/sample, as in step 812. The process should also check for parameters given in headers that can vary between files, but that must be constant for any given file. These efforts maximize the chances of acquiring the series of true headers quickly.

Figure 9:
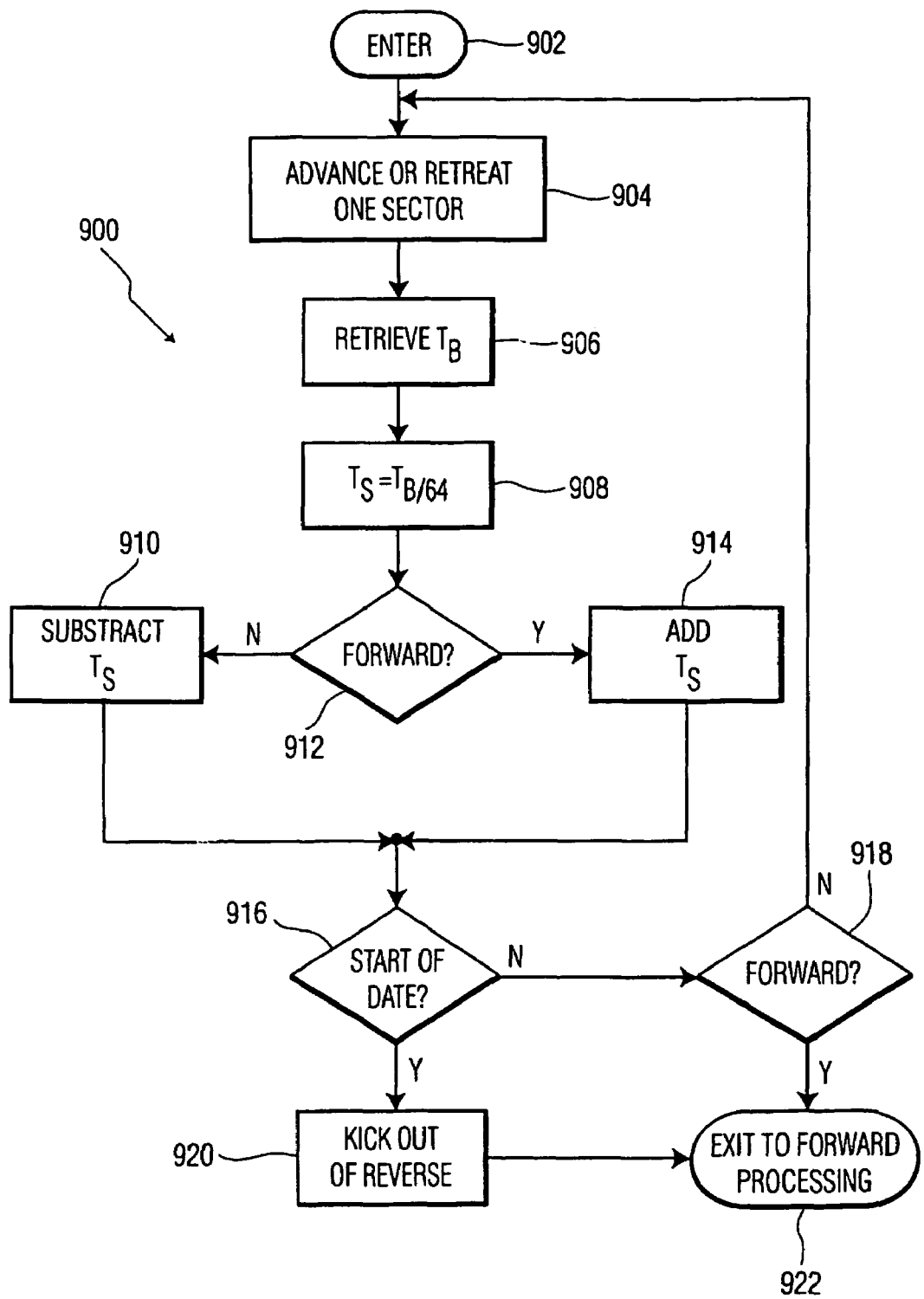
FIG. 9 is a flowchart diagram illustrating the steps for generating a timekeeping map and calculating and displaying an elapsed playback time in the reverse modes.

FIG. 9 illustrates the steps for determining and displaying the elapsed time when the player is operating in the reverse mode. In the reverse mode, the player operates by going back in reverse a predetermined amount and then going forward for a certain fragment in order to obtain the necessary data for determine the elapsed time. The process, in step 904 advances or retreats one sector. In step 906, the process retrieves the time per data block and in step 908 determines the time per sector by dividing the time per data block by 64. In step 912, the process determines whether the data has been accessed in the forward or reverse direction. If in the reverse direction, the time per sector is subtracted from the current elapsed time, and in the forward direction, the time per sector is added to the current elapsed time. In step 916, the process determines whether a start of data has been reached. If the start of data has been reached, the process leaves the reverse mode in step 920 and exits to forward processing in step 922. If the start of data has not been reached, the player determines whether a change of operating mode has been requested, for example, by changing to the forward mode. If the forward mode has been determined in step 918, the process exits to the forward processing mode in step 922. If the forward mode has not determined in step 918, the process returns to the beginning of the procedure by returning to step 904. In this manner, the elapsed time is determined during the reverse mode of operation. Note that the estimated time for each sector is only an approximation, but that whenever a complete block the elapsed time calculated for that block is exact.

Figure 10:
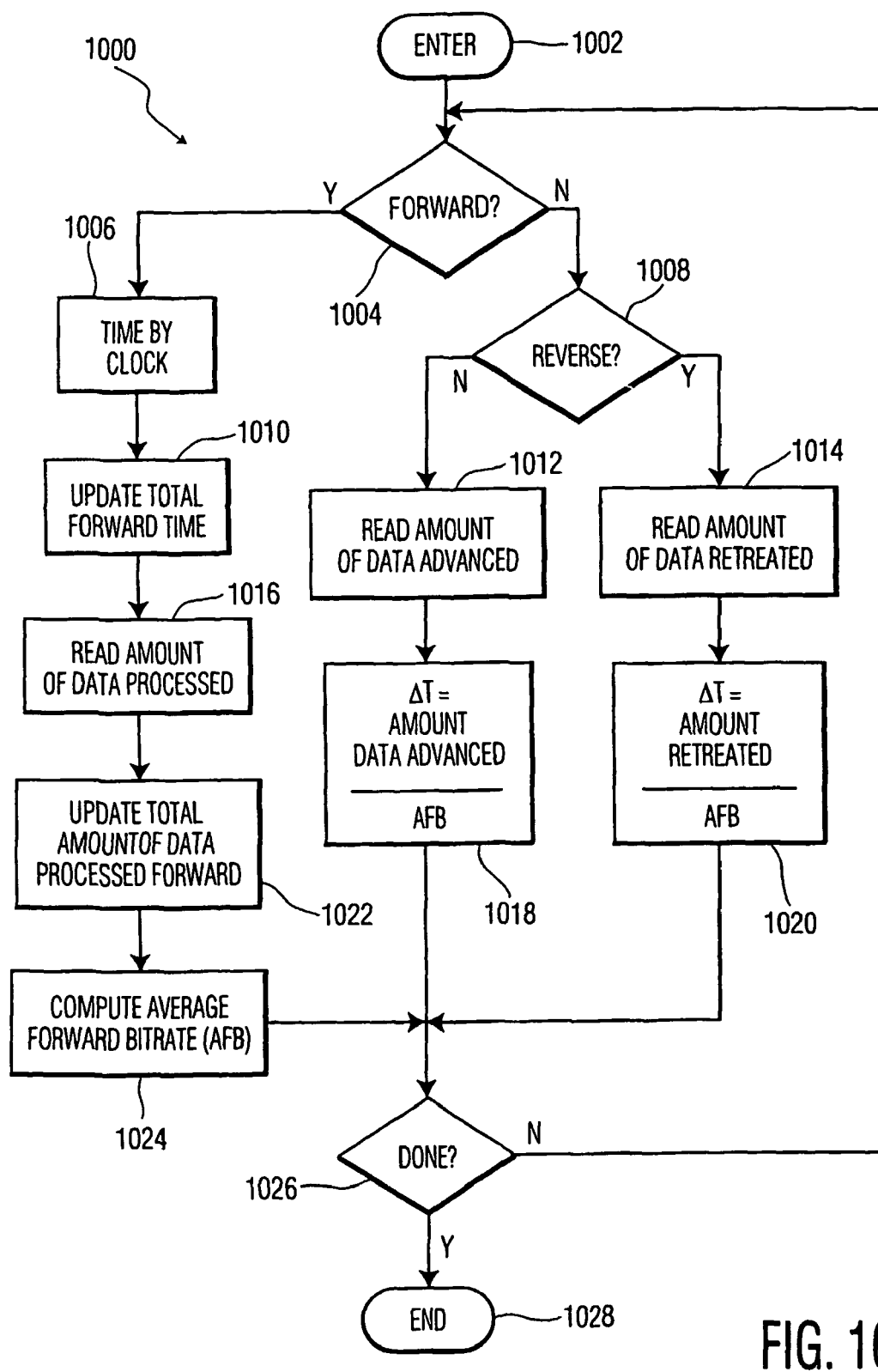
FIG. 10 is a flowchart diagram illustrating the steps for calculating and displaying an elapsed playback time without generating a timekeeping map.

FIG. 10 illustrates the steps for determining the elapsed time, without creating a timekeeping map when player 10 is operating in either the forward or reverse modes. In step 1004 the process determines whether the player is in the forward or reverse mode. If in the forward mode, or the normal-play mode, the process continues to step 1006, wherein the elapsed time is determined using a clock included in player 10. In step 1010, the process updates the total forward time. In step 1016, the process reads the amount of data processed, and in step 1022 the process updates the total amount of data processed in the forward direction. In step 1024, the average forward bitrate is ("AFB") computed. The process computes the AFB to be the sum total for all bits traversed in normal play divided by the sum total of all the times it took to traverse those bits. Alternatively, the process may calculate the AFB using a weighted approach, wherein a predetermined number of bits immediately prior to the calculation and the sum total of time associated with that number of bits may be more heavily weighted in the calculation that bits that are more distant in time. If normal play has not yet occurred, and fast forward has been started from the beginning of the file, the process may begin with a predetermined estimate of the average bitrate. For MP3 files, this is typically 128 kilobits per second. In step 1026, the process determines whether playback of the selected file is completed. If so, the process ends at step 1028, and if not, the process repeats from step 1004.

If in step 1004 it is determined that the player is not operating in the reverse mode, the process continues to step 1008 to determine whether the player is currently processing the data in the forward or reverse direction. If the data is not being processed in the reverse directions, the process reads the amount of data advanced in step 1012 and determines the change in time by dividing the amount of data advanced by the average forward bit rate determined in step 1024. If the data is being processed in the reverse direction, as determined in step 1008, the process reads the amount of data retreated in step 1014 and determines the change in elapsed time by dividing the amount of data retreated by the average forward bit rate. Again, it is determined in step 1026 whether the processing of the data of the selected file is completed. If so, the process ends at step 1028, and if not, the process repeats from step 1004.

Although the above-described timekeeping method does not require a timekeeping map to be precompiled before playback and therefore it does not require an extra pass through the audio data file, an embodiment of the present invention may also include a method of compiling a timekeeping map that is compiled prior to playback. A precompiled timekeeping map allows playback of the audio data to begin well into the audio data file. Additionally, it allows faster forward scanning of the audio data file in the event that DSP 12 is limited by the rate at which it can read the audio data file.

Calculations and experiments have shown that having an average mapping ratio of 10 seconds per 16 bit map word keeps timekeeping close to the one second time precision typical of timekeeping. Since this mapping ratio is about two bits per second, the typical audio data file requires a timekeeping map or data structure of only at least about four orders of magnitude smaller than the audio data file being mapped.

In the exemplary embodiment, suitable microcontrollers 22 include, but are not limited to, μPC78A4036 manufactured by NEC Corporation. Associated with microcontroller 22 is memory 23, in this case, 48 KB of ROM, and buffer memory 25 comprising 8 MB of RAM, providing 7 minutes of buffered play time at 128 kbps and 14 minutes of buffered play time at 64 kbps. Suitable DSP units 12 include, but are not limited to, TMS320NC5410 manufactured by Texas Instruments, Inc., of Dallas, Tex. DSP 12 also includes associated memory 11, in this case 64 KB of RAM. Suitable hard drives for data storage 32 include, but are not limited to, Microdrive™ manufactured by IBM Corporation of Armonk, N.Y. A 10 GB hard drive, for example, provides approximately 150 hours of audio at MP3 bit-rate of 128 kbps, or 300 hours at a bit-rate of 64 kbps.

It will be apparent to those skilled in the art that although the present invention has been described in terms of an exemplary embodiment, modifications and changes may be made to the disclosed embodiment without departing from the essence of the invention. For example, although the present invention has been described with reference to data storage 32 that is fixedly disposed within audio player 10, the present invention may be implemented using flash memory, another fixed storage device, optical device, or a memory card that is adapted to be coupled, either detachably or fixedly, to audio player 10, wherein the decoder program and audio data files are loaded onto the memory card by the music management software. Also, it is herein recognized that the present feature of loading the appropriate decoder programs and the audio data files may be implemented in the music management software using any one of a number of conventionally known programming methods, or combination of programming methods. Also, although the above is described in reference to an audio data player, the present invention may be extended to any portable data processing device, for example, video display devices, wherein the data may be encoded using one of a plurality of data encoding formats. Therefore, it is to be understood that the present invention is intended to cover all modifications as defined in the appended claims.

The invention claimed is:

1. A method for monitoring in an audio data player, during the processing of an audio data file having data portions capable of having different compression ratios, the elapsed playback for the audio data file, comprising the steps of:
   determining the compression ratio and size of each data portion traversed;
   calculating the playback time for each data portion traversed based on the compression ratio and size of each data portion traversed; and
   displaying the playback time on a display of the audio data player in response to the calculation.

2. The method of claim 1, wherein the determining step comprises determining elapsed time within the current data portion by interpolation.

3. The method of claim 1, further including the step of storing the playback time for each data portion traversed in a timekeeping map.

4. The method of claim 1, further including the step of adjusting an elapsed playback time counter based on the playback time for each data portion traversed.

5. The method of claim 1, wherein the calculating step comprises calculating elapsed playback time at an input to a buffer feeding an audio data decoder; and the elapsed playback time is adjusted by subtracting an estimated playback time of the data contained in the buffer.

6. The method of claim 1, wherein the compression ratio is determined based on the bit rate stored in data frame headers of the audio data file; and a confidence estimator locates frame headers and thereby locates the bit rate.

7. The method of claim 1, wherein the compression ratio is determined based on the bit rate stored in data frame headers of the audio data file; and an interval skipper locates frame headers and thereby locates the bit rate.

8. The method of claim 1, wherein each data portion includes a fixed time length of audio data and a variable length of data, the length of data being determined by the compression ratio for each data portion.

* * * * *